F. D. TAYLOR. 2 Sheets—Sheet 1.

APPARATUS FOR STOPPING ENGINES.

No. 11,470. Reissued Feb. 5, 1895.

Witnesses:

C. E. Buckland.

E. J. Hyde.

Inventor:

Frederick D. Taylor, by

Harry P. Williams,

Atty.

2 Sheets—Sheet 2.

F. D. TAYLOR.

APPARATUS FOR STOPPING ENGINES.

No. 11,470. Reissued Feb. 5, 1895.

Witnesses;
C. E. Buckland,
E. J. Hyde.

Inventor;
Frederick D. Taylor, by
Harry P. Williams
Atty.

UNITED STATES PATENT OFFICE.

FREDERICK D. TAYLOR, OF HARTFORD, CONNECTICUT, ASSIGNOR TO THE ELECTRO-AUTOMATIC APPLIANCE COMPANY, OF CONNECTICUT.

APPARATUS FOR STOPPING ENGINES.

SPECIFICATION forming part of Reissued Letters Patent No. 11,470, dated February 5, 1895.

Original No. 490,373, dated January 24, 1893. Application for reissue filed January 3, 1895. Serial No. 533,788.

*To all whom it may concern:*

Be it known that I, FREDERICK D. TAYLOR, of Hartford, Connecticut, have invented certain new and useful Improvements in Apparatus for Stopping Engines, of which the following is a specification.

The object of my invention is to provide an apparatus for closing the throttle valve of a steam engine or other motor, that may be quickly operated from points at a distance; and a further object is to provide an apparatus that will automatically reset itself.

To this end my invention consists in the details of the several parts making up the apparatus as a whole and in their combination as more particularly hereinafter described, and pointed out in the claims.

Figure 1:
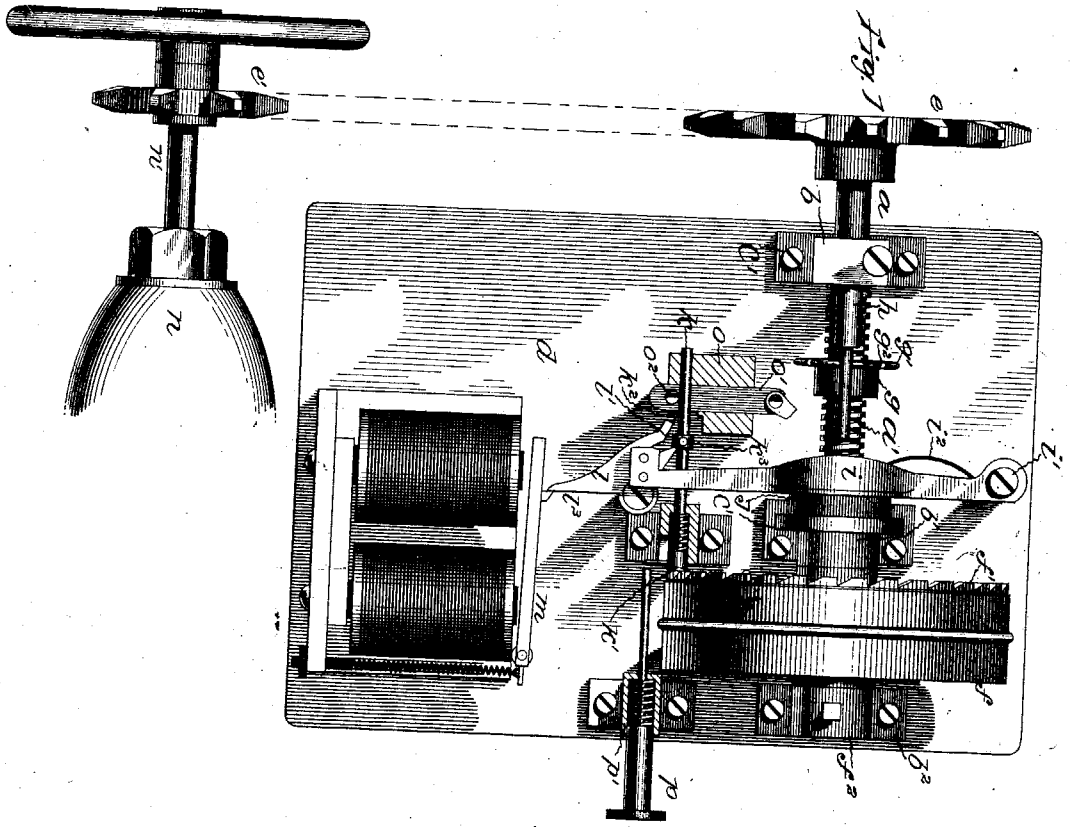
Figure 2:
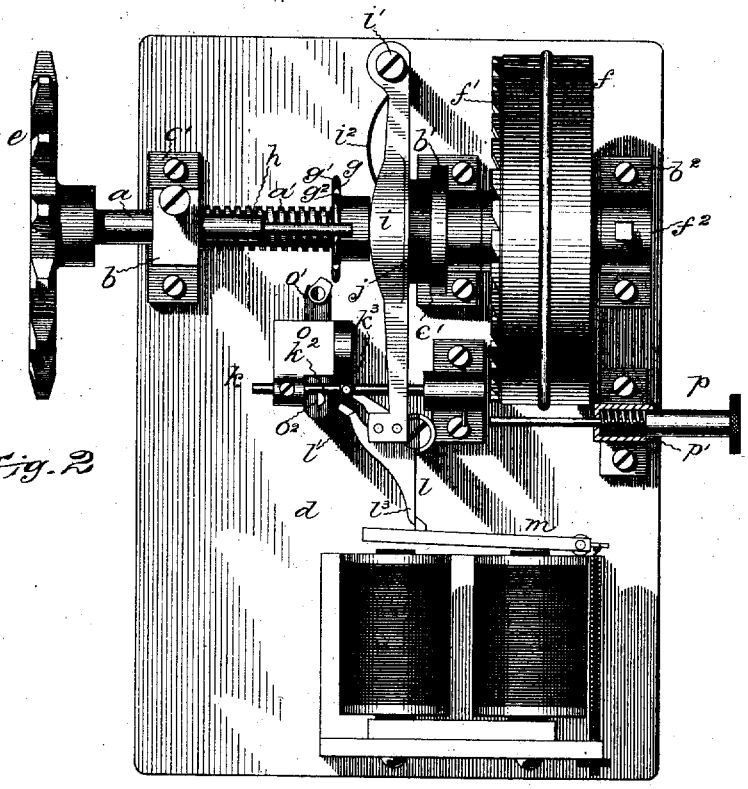
Figure 3:
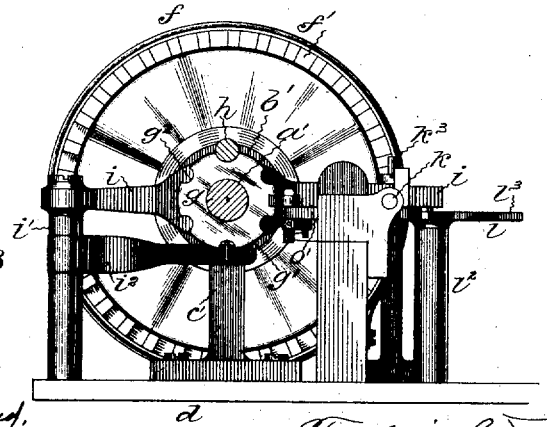

Referring to the drawings: Figure 1 is a plan of the apparatus with the mechanisms set in readiness to operate and close a valve on the release of the catch, parts in this view being broken away to show construction. Fig. 2 is a plan of the apparatus showing the position of the parts with spring barrel released from the hold of the clutch pawl, as after the device has operated to close a valve. Fig. 3 is a view in cross section of the main shaft looking toward the spring barrel.

In the accompanying drawings the letter $a$ denotes a shaft that is mounted in suitable bearings $b$ $b'$ formed in standards $c'$ that project from the base plate $d$. A sprocket wheel $e$ is secured to this shaft, preferably on the outer end, and there is also secured to the shaft in this instance a spring barrel $f$ that is provided on one face with a ratchet wheel $f'$, one member of a clutch device. A coil spring is arranged within the barrel with one end secured to the barrel and the other end secured to an axle $f^2$ which partly supports the barrel. This axle is secured to a bearing $b^2$ in any convenient manner.

A portion $a'$ of the shaft, preferably that which is located between the bearings $b$ and $b'$ is threaded and supports a nut $g$ that has a movement lengthwise of the shaft but is held against rotation thereon. This nut has a flange $g'$ in which is cut a series of locking notches $g^2$ that are engaged by a guide $h$ that is secured to the frame or a part fixed thereto, and projects lengthwise of and substantially parallel to the shaft. The object of this arrangement of the guide $h$ and the notched nut is to enable the inner position of the nut to be determined. By inner position is meant its position with relation to the shipping lever $i$ that has its fulcrum at $i'$ on one side of the shaft and extends transversely across the shaft, preferably embracing it, as in the form illustrated in the drawings. Between the back of the lever $i$ and the bearing $b'$ there is preferably arranged an elastic buffer $j$, the nut being located upon the shaft on the opposite side of the lever from the buffer.

When the spring in the spring barrel is relaxed, by lifting the guide $h$ out of its notch in the nut $g$, the nut may be turned until it presses the lever against the elastic buffer to the desired degree. When the proper position is reached the guide is secured in place and this so retains the nut that it will be returned each time to the same position on the threaded portion of the shaft by any degree of rotation of the latter under the impulse of the spring.

A spring pawl $k$ forms the other member of the clutch mechanism in the form of apparatus shown and its beveled end $k'$ operates in connection with the ratchet wheel $f'$ to hold the spring barrel in the desired position. The shipping lever projects beyond the spring pawl to a point where it engages a cam slot $l'$ in the tumbler $l$. This tumbler is pivoted to a fixed part of the frame, as to a post $l^2$ and has an arm $l^3$ adapted to engage a catch borne on the outer face of the armature of an electro magnet $m$.

The spring actuated shaft $a$ is connected with the spindle $n'$ of a throttle valve $n$ by means of a chain passing over the sprocket wheel $e$ on the shaft $a$ and a sprocket wheel $e'$ on the valve spindle $n'$, when the apparatus is to be used in connection with a steam engine or the like motor in which a valve or gate is used to control the flow of the steam or other fluid actuating the motor. When a throttle valve so connected to the stop mechanism is opened the shaft $a$ is turned in such manner as to wind up the spring in the spring barrel, and the rotary movement of the shaft $a$ causes the nut $g$ to move along the threaded portion of the shaft so the edge $g'$ of the nut encounters the end of the trip device $o$ and by sliding it draws the pin $o^2$ out of engagement with the locking notch $k^2$ of the spring pawl and this releases the pawl so that its beveled end is pushed by its spring into engagement with the teeth of the ratchet wheel.

The trip device comprises a slide $o'$ bearing on a stud on its end next to the nut a spring retained block with a beveled end, mounted so as to oscillate freely when pushed in one direction but not oscillate when engaged in the opposite direction. This block is in the path of movement of the edge of the nut and yields to allow the nut to move freely toward the shipping lever but does not yield when engaged in the opposite direction so that the nut operates in its movement to push the slide and move the pin $o^2$ out of engagement with the locking notch $k^2$.

On the shank of the spring pawl $k$ a shoulder $k^3$ is formed in position to be encountered by the shipping lever when the latter is thrown outward by the spring $i^2$.

When the apparatus is set in position to operate to shut down the motor throttle valve the parts are in the position shown in Fig. 1 of the drawings, and the apparatus can be caused to operate by making or breaking an electric circuit that includes the electro-magnet $m$, as by pushing a button or moving a switch. By causing the armature to be drawn toward the magnet the end of the tumbler is released so that it turns freely on the pivot, allowing the shipping lever $i$ to be thrown over under the impulse of the spring $i^2$ and encounter the shoulder $k^3$ so as to withdraw the pawl from engagement with the ratchet wheel. This allows the spring to recoil, the pawl being held in its outer position by means of the engagement of the pin $o^2$ on the slide of the trip device with the locking notch $k^2$ in the pawl shank. The recoil of the spring turns the spindle of the throttle valve in such manner as to shut off the flow of the fluid used to drive the motor.

By the rotation of the shaft $a$ the nut is caused to move toward and against the shipping lever which it pushes back against the buffer, the outer end of the shipping lever, by means of a pin engaging the cam slot $l'$, throwing the tumbler into engagement with the catch on the armature and thus resetting the releasing mechanism. The parts will then be in the position as illustrated in Fig. 2 of the drawings. As soon as the throttle valve is opened, as by turning the valve spindle by means of the handle in the ordinary manner, the spring is again wound up and the slide forced out by the movement of the nut so as to release the spring pawl and allow it to engage the teeth of the ratchet wheel. By this the device is reset so that when the tumbler is again released the apparatus will again operate to close the throttle valve without regard to the extent to which the latter has been opened.

There is provided in this apparatus as shown means for releasing the spring barrel mechanically by simply pressing upon the exposed end of a push button or rod $p$ that is mounted in a suitable support $p'$ with its inner end engaging the spring pawl in such manner as to cause the latter to be moved away from the ratchet wheel when the push rod is thrust inward.

The form of clutch mechanism shown is the one preferred, but it is obvious that other forms for temporarily holding the shaft in position with the coil-spring wound up and under tension may be employed without exercising invention, and the use of such other forms of clutch devices with the combination comes within the scope of my invention.

This stop apparatus is preferably inclosed in a suitable case or box and secured in a convenient position to enable the connection between the apparatus and the throttle valve to be easily made.

The elastic buffer is preferably made of india rubber or the like gum and it may be secured to a fixed part of the frame, as the side of the standard $c'$, or it may be borne on the side of the shipping lever $i$, and its function is to receive and afford a yielding stop for the shipping lever when it is pushed by the nut that travels along as the shaft rotates. This buffer breaks the shock of the recoil of the spring by acting as a brake to gradually stop the revolution of the shaft by retarding the movement of the shipping lever when pushed by the nut moved by the rotation of the shaft.

The circuit wires are connected with the electro-magnet in any common manner and provided with a common battery. These wires may be led to any desired localities in a mill, factory or other plant, and they are provided with push buttons or switches at suitable points by means of which the circuit can be controlled to operate the apparatus to close the valve and stop the engine when anything goes wrong.

I claim as my invention—

1. In an apparatus for stopping a steam engine or other motor, in combination, a spring actuated shaft having a threaded portion, a clutch part connected with said shaft, an actuating spring having one end connected with the shaft and the other end with a fixed part of the frame, a nut movable back and forth on the threaded portion of the shaft but held against rotation thereon, a spring actuated shipping lever extending across the shaft with its outer end connecting with a tumbler, the tumbler with its arm adapted to engage the armature of an electro magnet, the spring pawl having a shoulder located in the path of movement of the shipping lever, and the trip device with one end adapted to engage the spring pawl and the other located in the path of movement of the nut, all substantially as described.

2. In an apparatus for stopping an engine or other motor, in combination, a spring actuated shaft having a threaded portion, a clutch device having one part connected with said shaft and the other part mounted in operative relation thereto, the shipping lever extending across the shaft between an elastic buffer and a nut, the nut movable back and forth on the threaded portion of the shaft but held against rotation thereon, and an electro magnet having its armature adapted to engage the tumbler of the releasing and resetting mechanism, all substantially as described.

3. In an apparatus for stopping a steam engine or other motor, in combination, a spring actuated shaft having a threaded portion, a clutch part connected with said shaft, the actuating spring connected with the shaft and with a fixed portion of the frame, the sprocket wheel secured to the outer end of the shaft, a nut movable back and forth on the threaded portion of the shaft but held against rotation thereon, a shipping lever extending across the shaft and having its outer end engaging a cam slot in a tumbler, a buffer located back of the shipping lever, the tumbler having a cam slot engaged by a projection on the shipping lever and an arm engaged by a catch on the armature of an electro magnet, the armature having a catch, a clutch part mounted so as to be operated by the shipping lever, the trip device with means for holding the clutch parts disengaged, and the movable nut having a flange adapted to operate the trip device in its movement on the shaft, all substantially as described.

4. In an apparatus for stopping a steam engine or other motor, in combination, the spring actuated shaft having a threaded portion, the clutch part connected with one end of the shaft, a sprocket wheel secured to the other end of the shaft, an actuating spring connected with the shaft and with a fixed part of the frame, and mechanism substantially as described for releasing the clutch and automatically setting the releasing mechanism, all substantially as described.

5. In combination in an apparatus for stopping a steam engine or other motor, a spring actuated shaft having a threaded portion, the shaft actuating spring, the clutch parts connected with the shaft and with the frame respectively, and the releasing and resetting mechanisms comprising a notched nut borne on the threaded portion of the shaft and held against rotation thereon, all substantially as described.

6. In combination in an apparatus for stopping a steam engine or other motor, a spring actuated shaft having a threaded portion, the shaft actuating spring, the clutch parts connected with the shaft and with the frame respectively, the releasing and resetting mechanisms comprising a flanged nut borne on the threaded portion of the shaft and held against rotation thereon, the flange of the nut having a series of locking notches, all substantially as described.

7. In combination in an apparatus for stopping a steam engine or other motor, a spring actuated shaft, the clutch parts connected with the shaft and with the frame respectively, the releasing and resetting mechanisms comprising with the other elements a tumbler and a swinging shipping lever in operative engagement with each other, all substantially as described.

8. In combination in an apparatus for stopping a steam engine or other motor, a spring actuated shaft having a threaded portion, the clutch parts connected with the shaft and with the frame respectively, the releasing mechanisms substantially as described, and the resetting mechanisms comprising a nut movable back and forth on the threaded portion of the shaft and held against rotation thereon, all substantially as described.

FREDERICK D. TAYLOR.

Witnesses:
H. R. WILLIAMS,
O. B. PURINTON.